United States Patent
Keskula et al.

(10) Patent No.: US 6,847,188 B2
(45) Date of Patent: *Jan. 25, 2005

(54) FUEL CELL STACK MONITORING AND SYSTEM CONTROL

(75) Inventors: Donald H. Keskula, Webster, NY (US); Tien M. Doan, Columbia, MD (US); Bruce J. Clingerman, Palmyra, NY (US)

(73) Assignee: General Motors Corporation, Detroit, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/752,603

(22) Filed: Jan. 7, 2004

(65) Prior Publication Data

US 2004/0151955 A1 Aug. 5, 2004

Related U.S. Application Data

(62) Division of application No. 10/011,097, filed on Dec. 6, 2001, now Pat. No. 6,692,851, which is a continuation of application No. 09/345,125, filed on Jul. 6, 1999, now abandoned.

(51) Int. Cl.$^7$ ............................................. H01M 10/44
(52) U.S. Cl. ..................................................... 320/101
(58) Field of Search ........................... 320/101; 429/13, 429/17, 22–25

(56) References Cited

U.S. PATENT DOCUMENTS

| | | | |
|---|---|---|---|
| 4,128,700 A | 12/1978 | Sederquist | .................... 429/17 |
| 4,293,315 A | 10/1981 | Sederquist | ..................... 48/94 |
| 4,555,454 A | 11/1985 | Shuster | ........................ 429/51 |
| 4,642,272 A | 2/1987 | Sederquist | .................... 429/17 |

(List continued on next page.)

FOREIGN PATENT DOCUMENTS

| | | |
|---|---|---|
| DE | 19924938 A | 12/1999 |
| EP | 0862233 A | 9/1998 |
| EP | 0982788 A | 3/2000 |
| JP | 04121971 | 10/1978 |
| JP | 6030062 | 2/1985 |
| JP | 60032254 | 2/1985 |
| JP | 2098063 | 4/1990 |
| JP | 4058463 | 2/1992 |
| JP | 7142079 | 6/1995 |
| JP | 81138709 | 5/1996 |
| JP | 9055219 | 2/1997 |
| JP | 2000357526 A | 12/2000 |

OTHER PUBLICATIONS

M.T. Le et al., "Effects of Operating Parameters on PAFC Stack Performance", Proceedings of the $23^{rd}$ Intersociety Energy Conversion Engineering Conference, vol. 2, 1988, pp. 251–255.

(List continued on next page.)

*Primary Examiner*—Pia Tibbits
(74) *Attorney, Agent, or Firm*—Cary W. Brooks, Esq.; Linda M. Deschere, Esq.

(57) ABSTRACT

A control method for monitoring a fuel cell stack in a fuel cell system in which the actual voltage and actual current from the fuel cell stack are monitored. A preestablished relationship between voltage and current over the operating range of the fuel cell is established. A variance value between the actual measured voltage and the expected voltage magnitude for a given actual measured current is calculated and compared with a predetermined allowable variance. An output is generated if the calculated variance value exceeds the predetermined variance. The predetermined voltage-current for the fuel cell is symbolized as a polarization curve at given operating conditions of the fuel cell. Other polarization curves may be generated and used for fuel cell stack monitoring based on different operating pressures, temperatures, hydrogen quantities.

12 Claims, 3 Drawing Sheets

U.S. PATENT DOCUMENTS

| | | | |
|---|---|---|---|
| 4,650,727 A | 3/1987 | Vanderborgh et al. | 429/19 |
| 4,659,634 A | 4/1987 | Struthers | 429/19 |
| 4,670,359 A | 6/1987 | Beshty et al. | 429/17 |
| 4,678,723 A | 7/1987 | Wertheim | 429/17 |
| 4,816,353 A | 3/1989 | Wertheim et al. | 429/19 |
| 4,904,548 A | 2/1990 | Tajima | 429/22 |
| 4,923,768 A | 5/1990 | Kaneko et al. | 429/19 |
| 4,988,283 A | 1/1991 | Nagasawa et al. | 429/17 |
| 4,994,331 A | 2/1991 | Cohen | 429/17 |
| 5,248,567 A | 9/1993 | Amemiya et al. | 429/20 |
| 5,271,916 A | 12/1993 | Vanderborgh et al. | 423/246 |
| 5,272,017 A | 12/1993 | Swathirajan et al. | 429/33 |
| 5,316,871 A | 5/1994 | Swathirajan et al. | 429/33 |
| 5,334,463 A | 8/1994 | Tajima et al. | 429/9 |
| 5,372,617 A | 12/1994 | Kerrebrock et al. | 48/61 |
| 5,429,886 A | 7/1995 | Struthers | 429/44 |
| 5,484,577 A | 1/1996 | Buswell et al. | 422/211 |
| 5,484,666 A | 1/1996 | Gibb et al. | 429/34 |
| 5,518,705 A | 5/1996 | Buswell et al. | 423/247 |
| 5,518,828 A | 5/1996 | Senetar | 429/26 |
| 5,554,453 A | 9/1996 | Steinfeld et al. | 429/17 |
| 5,605,770 A | 2/1997 | Andreoli et al. | 429/20 |
| 5,631,532 A | 5/1997 | Azuma et al. | 320/102 |
| 5,637,415 A | 6/1997 | Meltser | 429/17 |
| 5,702,838 A | 12/1997 | Yasumoto et al. | 429/40 |
| 5,760,488 A | 6/1998 | Sonntag | 307/10.1 |
| 5,763,113 A | 6/1998 | Meltser et al. | 429/13 |
| 5,789,091 A | 8/1998 | Wozniczka et al. | 429/12 |
| 5,945,229 A | 8/1999 | Meltser | 429/13 |
| 6,007,930 A | 12/1999 | Adams et al. | 429/13 |
| 6,692,851 B2 * | 2/2004 | Keskula et al. | 429/13 |

OTHER PUBLICATIONS

Szaniszio, "The Advanced Low–Emissions Catalytic–Combustor Program: Phase 1—Description and Status", ASME #79–GT–192.

Krill et al., "Catalytic Combustion for System Applications", ASME #79–HT–54.

Hall et al., "A Porous Media Burner for Reforming Methanol for Fuel Cell Powered Electric Vehicles", SAE Paper #950095.

European Search Report mailed Jun. 17, 2002.

* cited by examiner

FUEL CELL STACK MONITORING AND SYSTEM CONTROL

CROSS REFERENCE TO CO-PENDING APPLICATION

This application is a divisional of U.S. patent application Ser. No. 10/011,097, filed Dec. 6, 2001 now U.S. Pat. No. 6,692,851 which is a continuation of U.S. patent application Ser. No. 09/345,125, filed Jul. 6, 1999 (now abandoned). The disclosure of the above application is incorporated herein by reference.

This application discloses subject matter which is disclosed and claimed in co-pending U.S. patent application Ser. No. 09/358,080, filed in Jul. 6, 1999 (now abandoned) in the names of David J. Hart-Predmore and William H. Pettit, and entitled "Methanol Tailgas Combustor Control Method," the entire contents of which are incorporated by reference.

STATEMENT OF GOVERNMENT SUPPORT

The Government of the United States of America has rights in this invention pursuant to Agreement No. DE-AC02-90CH10435 awarded by the U.S. Department of Energy.

FIELD OF THE INVENTION

This invention relates to a fuel cell system, and more particularly to a system having a plurality of cells which consume an $H_2$-rich gas to produce power for vehicle propulsion.

BACKGROUND OF THE INVENTION

Fuel cells have been used as a power source in many applications. Fuel cells have also been proposed for use in electrical vehicular power plants to replace internal combustion engines. In proton exchange membrane (PEM) type fuel cells, hydrogen is supplied to the anode of the fuel cell and oxygen is supplied as the oxidant to the cathode. PEM fuel cells include a "membrane electrode assembly" (MEA) comprising a thin, proton transmissive, solid polymer membrane-electrolyte having the anode on one of its faces and the cathode on the opposite face. The MEA is sandwiched between a pair of electrically conductive elements which (1) serve as current collectors for the anode and cathode, and (2) contain appropriate channels and/or openings therein for distribution the fuel cell's gaseous reactants over the surfaces of the respective anode and cathode catalysts. A plurality of individual cells are commonly bundled together to form a PEM fuel cell stack. The term fuel cell is typically used to refer to either a single cell or a plurality of cells (stack), depending on the context. A group of cells within the stack is referred to as a cluster.

In PEM fuel cells hydrogen ($H_2$) is the anode reactant (i.e., fuel) and oxygen is the cathode reactant (i.e., oxidant). The oxygen can be either a pure form ($O_2$), or air (a mixture of $O_2$ and $N_2$). The solid polymer electrolytes are typically made from ion exchange resins such as perfluoronated sulfonic acid. The anode/cathode typically comprises finely divided catalytic particles, which are often supported on carbon particles, and admixed with a proton conductive resin. The catalytic particles are typically costly precious metal particles. These membrane electrode assemblies which comprise the catalyzed electrodes, are relatively expensive to manufacture and require certain controlled conditions in order to prevent degradation thereof.

For vehicular applications, it is desirable to use a liquid fuel such as an alcohol (e.g., methanol or ethanol), or hydrocarbons (e.g., gasoline) as the source of hydrogen for the fuel cell. Such liquid fuels for the vehicle are easy to store onboard and there is a nationwide infrastructure for supplying liquid fuels. However, such fuels must be dissociated to release the hydrogen content thereof for fueling the fuel cell. The dissociation reaction is accomplished heterogeneously within a chemical fuel processor, known as a reformer, that provides thermal energy throughout a catalyst mass and yields a reformate gas comprising primarily hydrogen and carbon dioxide. For example, in the steam methanol reformation process, methanol and water (as steam) are ideally reacted to generate hydrogen and carbon dioxide according to this reaction: $CH_3OH+H_2O \rightarrow CO_2+3H_2$. The reforming reaction is an endothermic reaction that requires external heat for the reaction to occur.

Fuel cell systems which process a hydrocarbon fuel to produce a hydrogen-rich reformate for consumption by PEM fuel cells are known and are described in co-pending U.S. patent application Ser. Nos. 08/975,442 and 08/980,087, now respectively U.S. Pat. Nos. 6,232,005 and 6,077,620, filed in the name of William Pettit in November, 1997, and U.S. Ser. No. 09/187,125, now U.S. Pat. No. 6,238,815, Glenn W. Skala et al., filed Nov. 5, 1998, and each assigned to General Motors Corporation, assignee of the present invention. A typical PEM fuel cell and its membrane electrode assembly (MEA) are described in U.S. Pat. Nos. 5,272,017 and 5,316,871, issued respectively Dec. 21, 1993 and May 31, 1994, and assigned to General Motors Corporation, assignee of the present invention, and having as inventors Swathirajan et al.

For vehicular power plants, the reaction within the fuel cell must be carried out under conditions which preserve the integrity of the cell and its valuable polymeric and precious metal catalyst components. Since the anode, cathode and electrolyte layers of the MEA assembly are each formed of polymers, it is evident that such polymers may be softened or degraded if exposed to severe operating conditions, such as an excessively high temperature. This may occur if there is a defective cell in a stack.

Monitoring of the overall stack voltage and comparison to a nominal, expected voltage for a given load or current, detects a problem after it has occurred. Thus, it would be desirable to provide a method and control that detects a performance decrease trend, rather than an actual problem, so that the likelihood of degradation of a fuel cell is reduced.

SUMMARY OF THE INVENTION

The present invention is a control method usable in a fuel cell system having a fuel cell stack wherein the hydrogen reacts with an oxidant to supply electrical power to an external load connected to the stack. The control method of the present invention comprises the steps of:

(a) monitoring actual voltage and actual current from the fuel cell stack;

(b) determining an expected magnitude of voltage as a function of said actual current based on a predetermined relationship between voltage and current;

(c) calculating a variance value between said actual voltage and said expected voltage magnitudes; and (d) generating a signal if said calculated variance value exceeds a predetermined variance value.

Preferably, a constant or different predetermined variance values are established for different loads or power output. Also, different variance values are established for different fuel cell stack operating parameters.

The predetermined relationship between voltage and current for a given fuel cell is symbolized as a voltage-current polarization curve.

The difference between the expected voltage and the measured voltage for a given actual current is compared with the predetermined variance value for the predicted voltage and/or actual current to determine if the predetermined variance value is exceeded in either a positive or negative direction. An alarm or remedial action is taken if the calculated variance value exceeds the predetermined variance value.

In another aspect, the present control method also contemplates determining an expected value of current as a function of the actual measured voltage based on the predetermined voltage-current relationship.

The monitoring control method of the present invention provides unique advantages in the case where a fuel cell system does not directly monitor the rate of hydrogen flow to the fuel cell. The control method of the present invention monitors fuel cell operation to detect when more power is attempted to be drawn out of the fuel cell then the fuel cell is capable of supplying where there is not enough hydrogen to create the desired electrical power. The control method, by providing an early warning of such a condition, enables corrective action to be immediately taken to prevent permanent deterioration of the fuel cell stack.

The present control method can be easily implemented in existing fuel cell controllers. Further, the present control method is usable with any type of fuel cell.

BRIEF DESCRIPTION OF THE DRAWINGS

The various features, advantages and other uses of the present invention will become more apparent by referring to the following description and drawings in which.

DETAILED DESCRIPTION OF THE PREFERRED EMBODIMENTS

Figure 1:
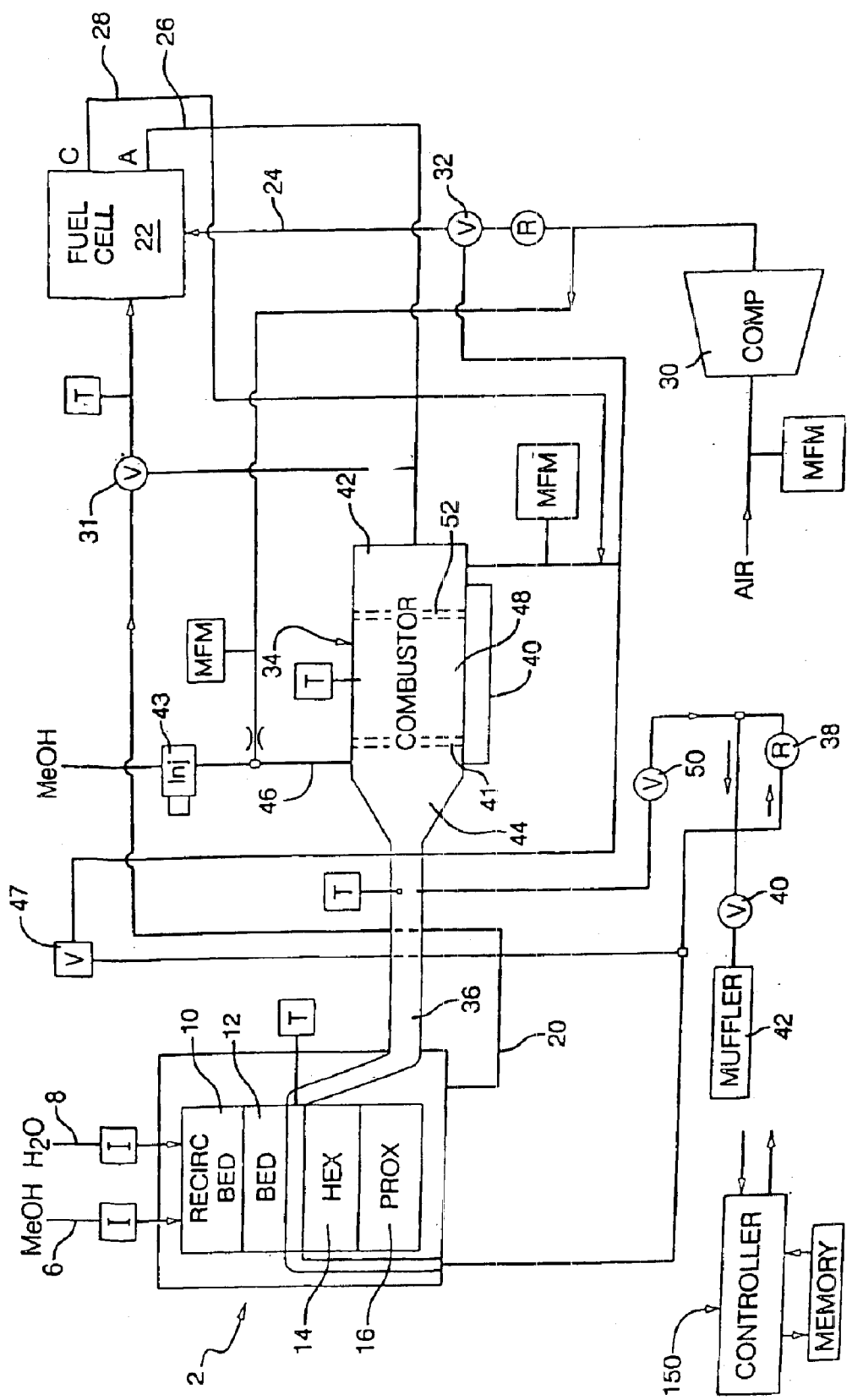
FIG. 1 is a flow diagram depicting a fuel cell apparatus which can utilize the fuel cell stack monitoring control method of the present invention.

In one aspect, the invention provides a method and system to protect the integrity of the fuel cell stack from deterioration by detecting significant variance from performance deemed acceptable and provides timely opportunity to implement corrective action. The fuel cell system has a fuel processor which supplies a hydrogen-rich stream to a stack of fuel cells, wherein the hydrogen reacts with an oxidant, typically air, to supply electrical power to an external load.

In the method of the invention, the voltage and current of a fuel cell stack are monitored to detect abnormal performance relative to what is deemed acceptable based on one or more established operating characteristics for the stack. In one aspect, for every level of actual power output from the fuel cell, there is an expected power output or range thereof at a given load. More particularly, a fuel cell stack can be characterized by a voltage at a given current or conversely, as a current at a given voltage. This is called a polarization curve. A family of polarization curves are determinable as a function of fuel cell stack operating conditions. These operating conditions include, but are not limited to, stack pressure, temperature, quantity of hydrogen, quantity of oxidant ($O_2$), nitrogen in air accompanying $O_2$, and quantity of CO (carbon monoxide) and other minor gases in the hydrogen-rich fuel stream. In simple terms, for a given operating condition or range of operating conditions, it is possible to establish a relatively nominal polarization curve and acceptable variance from the curve, or deadband, for such operating conditions.

The relationship between current (I) and voltage (V) is able to be established for a fuel cell stack as a function of load. This is typically an inverse proportional relationship as shown in the exemplary polarization curve of FIG. 3. In one aspect, if the relationship between actual current and actual voltage is outside of the deadband or variance limits about the curve, a diagnostic, alarm, shut down or reduced fuel cell power output is generated.

In another aspect, the relationship between V and I is predicted to vary according to a family of curves based on many stack operating variables. The extent to which the stack's operating variables affect actual and predicted acceptable performance varies with the design features of the stack and system with which it is used. If a particular stack is sensitive to the operating conditions variables, such as pressure (P), temperature (T), feed gas flow and concentration, then multiple polarization curves are preferred to increase the precision of the diagnostic. The term polarization curve is used herein for convenience and encompasses a family or multiple polarization curves for particular fuel cell stack.

More specifically, the system within which the fuel cell is used is typically subject to a wide range of operating conditions. For example, a high degree of variability in fuel processor-generated feed gas temperature and pressure may dictate the need for multiple polarization curves. Thermodynamic and electrochemical phenomena within the stack during operation influence the level of power produced. Therefore, in one aspect, the invention contemplates establishing a relationship between voltage and current, as modified by the other operating variables mentioned above, for example, stack temperature and pressure. Then, variance from the relationship is calculated based on monitored V, I, T and P. In another aspect, a relatively simplified implementation is based on establishing acceptable level of variance in the voltage-current relationship based on nominal, substantially constant, temperature, pressure and other stack variables. Actual stack voltage and current are monitored, and the variance between actual and predicted power determined. As a result, many possible approaches are usable for comparing actual power to predicted acceptable power, depending on the complexity and number of operating variables involved.

This may be further understood with reference to the fuel cell system shown in FIG. 1 by example only. Therefore, before further describing the invention, it is useful to understand the system within which monitoring and control of fuel cell stack operation occurs.

FIG. 1 illustrates an example of a fuel cell system. The system may be used in a vehicle (not shown) as an energy source for vehicle propulsion. In the system, a hydrocarbon is processed, for example, by reformation and preferential oxidation processes to produce a reformate gas which has a relatively high hydrogen content on a volume basis. Therefore, reference to hydrogen-rich or relatively high hydrogen content, refers to such content on a volume basis which is a quantity interchangeable with molar basis to express relative amounts of constituents.

The invention is hereafter described in the context of a fuel cell fueled by a reformate prepared from methanol (MeOH). However, it is to be understood that the principles embodied herein are equally applicable to fuel cells generally, regardless of the fuel or hydrogen source used. There are other reformable hydrocarbon and hydrogen-containing fuels such as ethanol or gasoline, which are used to produce hydrogen.

As shown in FIG. 1, a fuel cell apparatus includes a fuel processor 2 for catalytically reacting methanol from a methanol stream 6 and water or steam from a water stream 8 in a recirculating bed 10 and a catalytic bed 12 to form a hydrogen-rich reformate gas stream. A heat exchanger 14 is interposed between the catalytic bed 12 and a preferential oxidation (PROX) reactor 16. The reformate output gas stream comprises primarily $H_2$ and $CO_2$, but also includes $N_2$, CO and water. The reformate stream passes through the preferential oxidation (PROX) reactor 16 to reduce the CO-levels therein to acceptable levels (i.e., below 20 ppm). The $H_2$ rich reformate 20 is then fed through valve 31 into the anode chamber of a fuel cell 22. At the same time, oxygen (e.g., air) from an oxidant stream 24 is fed into the cathode chamber of the fuel cell 22. The hydrogen from the reformate stream 20 and the oxygen from the oxidant stream 24 react in the fuel cell 22 to produce electricity.

Exhaust or effluent 26 from the anode side of the fuel cell 22 contains some unreacted hydrogen. The exhaust or effluent 28 from the cathode side of the fuel cell 22 contains some unreacted oxygen. Air for the oxidant stream 24 is provided by a compressor 30 and is directed to the fuel cell 22 by a valve 32 under normal operating conditions. During start-up, however, the valve 32 is actuated to provide air to the input of a combustor 34 used to heat the fuel processor 2, as will be described in more detail hereinafter.

Heat from the heat exchanger 14 heats the catalyst bed(s) 10 and 12 in the fuel processor 2 and also heats the PROX 16 during start up. In this regard, the $H_2O$—MeOH mixture supplied to the fuel processor 2 will be vaporized and preferably be recirculated/refluxed several times (e.g., 20×) through the recirculating bed 10 in the fuel processor 2, the heat exchanger side of the bed 12, the PROX 16 and the heat exchanger 14 such that the mixture also functions as a heat transfer medium for carrying heat from the heat exchanger 14 into the beds 10 and 12 of the fuel processor 2 and to the PROX 16.

The heat exchanger 14 itself is heated from exhaust gases 36 exiting the catalytic combustor 34. The gases 36 exiting the heat exchanger 14 are still hot and could be passed through an expander, not shown, which could drive the compressor 30 or utilized in another manner. In the present implementation, as shown in FIG. 1, the exhaust gases from the fuel processor 2 pass through a regulator 38, a shutoff valve 40 and a muffler 42 before being dumped to atmosphere.

MeOH vapor 40 emanates from a vaporizer 41 nested in the exhaust end 44 of the combustor 34. The vaporizer 41 is a heat exchanger that extracts heat from the combustor 34 exhaust to vaporize a first fuel stream, such as liquid MeOH 46 provided to the vaporizer 41 by fuel metering device 43 from the vehicle's fuel tank. The MeOH vapor 40 exiting the vaporizer 41 and the anode effluent 26 are reacted in a catalyst section 48 of the combustor 34 lying intermediate the inlet and exhaust ends 42 and 44 respectively of the combustor 34. Oxygen is provided to the combustor 34 either from the compressor 30 (i.e., via valve 32) or from a second air flow stream, such as a cathode effluent stream 28 depending on system operating conditions. A valve 50 permits dumping of the combustor exhaust 36 to atmosphere when it is not needed in the fuel processor 2.

Further details concerning the construction of the combustor 34 can be had by referring to pending U.S. patent applications Ser. Nos. 08/975,422 and 08/980,087, now respectively U.S. Pat. Nos. 6,232,005 and 6,077,620, filed in the name of William Pettit in November 1997, the entire contents of which are incorporated herein by reference.

An electric heating element 52 is provided upstream of the catalyst bed 48 in the combustor 34 and serves to vaporize the liquid fuel 46 entering the combustor 34, heat the gas entering the bed 48 as well as preheating the bed 48 during start-up of the combustor 34. The heating element 52 may or may not be catalyzed. After start-up, as described hereafter, the electric heater 52 is no longer required since the fuel will be vaporized by the exhaust gases emanating from the exhaust end 44 of the combustor 34. A preferred electric heater 52 comprises a commercially available, uncatalyzed extruded metal monolith resistance element such as is used to light off the catalyst of a catalytic converter used to treat IC engine exhaust gases.

The exhaust end 44 of the combustor 34 includes a chamber that houses the vaporizer 41 which is a coil of metal tubing which is used to vaporize liquid fuel to fuel the combustor 34. More specifically, under normal post-start-up conditions, air or cathode effluent 28 may be introduced into the inlet end of the coil and mixed with liquid fuel sprayed into the inlet end via a conventional automotive type fuel injector. The airborne atomized fuel passes through the several turns of the heated coil tube, and therein vaporizes and exits the tube at an outlet which is located in the cathode effluent supply conduit. This vaporized first fuel stream supplements a second fuel stream or anode effluent 26 as fuel for the combustor 34 as may be needed to meet the transient and steady state needs of the fuel cell apparatus. The vaporizer coil is sized to vaporize the maximum flow rate of fuel with the minimum combustor exhaust flow rate, and is designed to operate at temperatures exceeding the autoignition temperature of the MeOH-air mixture therein throughout its fuel operational range. Autoignition within the vaporizer is avoided, however, by insuring that the velocity of the mix flowing through the coil significantly exceeds the worst-case flame speed of the mixture which varies with the composition of the inlet streams.

The amount of heat demanded by the fuel processor 2 which is to be supplied by the combustor 34 is dependent upon the amount of fuel input and ultimately the desired reaction temperature in the fuel processor 2. To supply the heat demand of the fuel processor 2, the combustor 34 utilizes all anode exhaust or effluent and potentially some liquid fuel. Enthalpy equations are used to determine the amount of cathode exhaust or air to be supplied to the combustor 34 to meet the desired temperature requirements of the combustor 34 and ultimately to satisfy the fuel processor 2. The oxygen or air provided to the combustor 34 includes one or both of cathode effluent exhaust 28 which is typically a percentage of the total oxygen supplied to the cathode of the fuel cell 22 and a compressor output air stream depending on whether the apparatus is operating in a start-up mode wherein the compressor air stream is exclusively employed or in a run mode using the cathode effluent 28 and/or compressor air. In the run mode, any total air, oxygen or diluent demand required by the combustor 34 which is not met by the cathode effluent 28 is supplied by the compressor 30 in an amount to balance the enthalpy equations to reach the desired reaction temperature within the combustor 34 so as to supply the amount of heat required by the fuel processor 2 at the desired temperature. The air control is implemented via an air dilution valve 47 which is a stepper motor driven valve having a variable orifice to control the amount of bleed-off of cathode exhaust supplied to the combustor 34.

The fuel cell apparatus operates as follows. At the beginning of operations when the fuel cell apparatus is cold and starting up: (1) the compressor 30 is driven by an electric motor energized from an external source (e.g., a battery) to provide the necessary system air; (2) air is introduced into the combustor 34 as well as the input end of the vaporizer 41; (3) liquid fuel 46 (e.g., MeOH) is injected into the inlet end of the vaporizer 41 via a fuel injector, and atomized as fine droplets with the air flowing therein; (4) the air-MeOH droplet mix exits the vaporizer 41 and mixes with compressor air introduced into the combustor 34, and is then introduced into the input end 42 of the combustor 34; (5) the mix passes through a flame arrestor in the front of the combustor 34; (6) the mix is then heated by the heater 52 to vaporize the liquid droplets and heat the mixture; (7) the preheated vaporous mix then enters a mixing-media bed for still further intimate mixing before contacting the light-off catalyst bed; (8) upon exiting the mixing-media bed, the mix begins oxidizing on the light-off catalyst bed just before it enters a primary catalyst bed 48, or reacting section of the combustor 34, where substantially complete combustion of the fuel is effected; and (9) the hot exhaust gases exiting the catalyst bed are conveyed to the heat exchanger 14 associated with the fuel processor 2.

Once the fuel processor temperature has risen sufficiently to effect and maintain the reformation process: (1) valve 32 is activated to direct air to the cathode side of the fuel cell 22; (2) MeOH and water are fed to the fuel processor 2 to commence the reformation reaction; (3) reformate exiting the fuel processor 2 is fed to the anode side of the fuel cell 22; (4) anode effluent 26 from the fuel cell 22 is directed into the combustor 34; (5) cathode effluent 28 from the fuel cell 22 is directed into the combustor 34; (6) air is introduced into the vaporizer 41; (7) liquid methanol is sprayed into the vaporizer 41; (8) the methanol-air mix circulates through the heated vaporizer coil where the MeOH vaporizes; (9) the methanol-air mix along with the cathode effluent 28 then mixes with the anode effluent 26; and (10) the mix is burned on the catalyst bed of the combustor 34.

During normal (i.e., post start-up) operating conditions, the heater 42 is not used as the vaporizer 41 alone vaporizes the MeOH and preheats the MeOH-air mix. Under certain conditions, as described hereafter, the combustor 34 could operate solely on the anode and cathode effluents, without the need for additional MeOH fuel from the vaporizer 41. Under such conditions, MeOH injection to the combustor 34 is discontinued. Under other conditions, e.g., increasing power demands, supplemental fuel is provided to the combustor 34.

As described above, the combustor 34 receives multiple fuels, such as a methanol-air mix as well as anode effluent 26 from the anode of the fuel cell 22.

Oxygen depleted exhaust air 28 from the cathode of the fuel cell 22 and air from the compressor 30 are also supplied to the combustor 34.

According to the present fuel cell example, a controller 150 shown in FIG. 1 controls the operation of the combustor 34. Anode exhaust or effluent plus a liquid fuel, i.e., methanol, if required, support the energy requirements of the combustor 34. An enthalpy balance maintains the desired reaction by temperature controlling the amount of air and/or cathode exhaust supplied to the combustor 34 to meet all fuel processor heat requirements.

It should be noted that the energy requirements of the apparatus components are expressed herein in terms of power. This is for convenience and is meant to express an energy rate, often in units of kilowatts, rather than BTU per second.

The controller 150 may comprise any suitable microprocessor, microcontroller, personal computer, etc., which has central processing unit capable of executing a control program and data stored in a memory. The controller 150 may be a dedicated controller specific to the combustor 34 or implemented in software stored in the main vehicle electronic control module. Further, although the following description describes a software based control program for controlling the combustor 34 in various modes of operation or sequence, it will also be understood that the combustor control can also be implemented in part or whole by dedicated electronic circuitry.

The controller 150 controls the operation of the combustor 34 in six different modes or sequences of operation. The separate modes of operation include (1) combustor start-up, (2) combustor operation during fuel processor warm-up, (3) combustor operation during fuel processor start-up, with the fuel cell off-line, (4) combustor operation during fuel processor run mode with the fuel cell stack on-line, and (5) combustor shutdown.

Further details concerning the construction and operation of the above-described fuel cell apparatus can be had by referring to co-pending U.S. patent application Ser. No. 09/358,080, filed Jul. 6, 1999 (now abandoned), in the names of David J. Hart-Predmore and William H. Pettit, and entitled "Methanol Tailgas Combustor Control Method", the entire contents of which are incorporated herein by reference.

Figure 2:
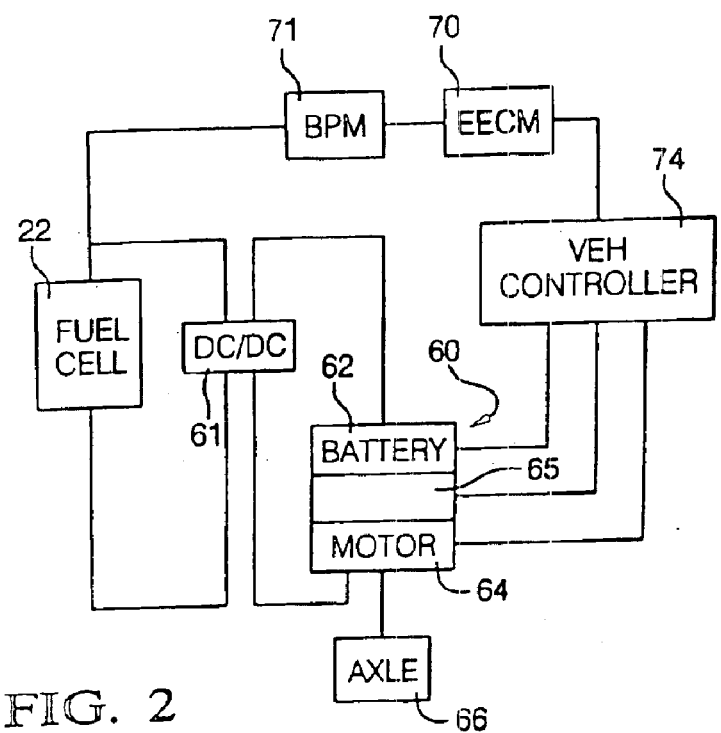
FIG. 2 is a flow diagram of the fuel cell apparatus shown in FIG. 1 connected in a pictorial representation of a use application.

In a preferred embodiment, the fuel cell system includes the fuel cell 22 as part of an external circuit 60 (see FIG. 2) wherein a portion of the external circuit 60, comprises a battery 62, an electric motor 64 and drive electronics 65 constructed and arranged to accept electric energy from a DC/DC converter 61 coupled to the fuel cell 22 and to convert the DC power to mechanical energy from the motor 64. The battery 62 is constructed and arranged to accept and store electrical energy supplied by the fuel cell 22 and to provide electric energy to motor 64. The motor 64 is coupled to driving axle 66 to rotate wheels of a vehicle (not shown). An electrochemical engine control module (EECM) 70 and a battery pack module (BPM) 71 monitor various operating parameters, including, but not limited to, the voltage and current of the stack which is done by the battery pack module 71, for example. The BPM 71 sends an output signal (message) to the vehicle controller 74 based on conditions monitored by the BPM 71. The vehicle controller 74 controls operation of the battery 62, the drive electronics 65 and the electric motor 64 in a conventional manner.

The term "fuel cell" is often used to refer to an individual cell and also may refer to a fuel cell stack which contains many individual fuel cells often on the order of one hundred or more, connected in series. Each cell within the stack includes the membrane electrode assembly (MEA) described earlier, and each such MEA provides its increment of voltage. A group of cells within the stack is referred to as a cluster.

The overall voltage of the stack or cluster voltages can be monitored to provide a determination of its operating condition. However, this does not provide information concerning the condition of the stack as a function of demand (load). The electric motor 64 which converts electric energy from the fuel cell 22 into mechanical energy places a demand (load) on the fuel cell stack. By the method of the invention, if the actual power produced by the stack is significantly different from a range of power levels deemed acceptable at a given load, a signal is generated which can activate an alarm, indicator or initiate a fuel cell shutdown.

In a preferred embodiment, the invention provides a method for comparing actual power to expected power or to a range of expected power at a given load for a fuel cell stack which operates in a fuel cell system. In a preferred embodiment, the actual voltage and actual current of the fuel cell stack are monitored. The expected voltage as a function of the actual current is determined based on a predetermined relationship between voltage and current. In other words, a predetermined relationship between voltage and current for a particular type of fuel cell is established, the actual current is substituted into this relationship and an expected voltage value is then determined. A variance between the actual voltage and the expected voltage is then calculated. If the variance so calculated exceeds a predetermined acceptable variance, a signal is generated and corrective action is taken or indicated. This action may include fuel cell system shutdown, partial shut down or reduced power output, etc.

The present method also is adaptable to apply the actual voltage to the voltage-current relationship and obtain an expected current at the actual voltage.

In its simplest implementation, the variance is determined on the basis of monitoring actual voltage and current and comparing the actual voltage and current to the predicted acceptable relationship between voltage and current as determined based on assumed conditions of temperature, pressure and feed gas flow. The relationship between voltage and current is established over the full range of expected currents. Acceptable variance from values defined by voltage-current relationship are determined. In a more complex implementation, other fuel cell stack operating parameters which affect performance such as pressure, temperature, supply of hydrogen-rich stream, and supply of oxidant are also considered and may result in a plurality of voltage-current relationships or polarization curves for different pressures, temperatures, hydrogen stream quantity, etc.

The variance or deadband about the polarization curve in both positive and negative directions with respect to the polarization curve can be established in several different ways. First, as described hereafter, the variance is defined as a percent error of the difference between the actual voltage and the expected voltage at a given load current. A three percent (3%) variance or limit can be used in this aspect, by example. Further, as described hereafter, both low and high or negative or positive limits can be established with respect to the polarization curve. Alternately, the absolute value of the error between the expected voltage and the actual voltage can be used for variance determination.

It is also possible, according to another aspect of the present invention, to provide a non-linear deadband or variance with respect to a particular polarization curve. In this manner, in certain portions of the polarization curve, such as at high current levels, the predetermined variance can be made larger or smaller than the constant variance shown in FIG. 3.

Figure 3:
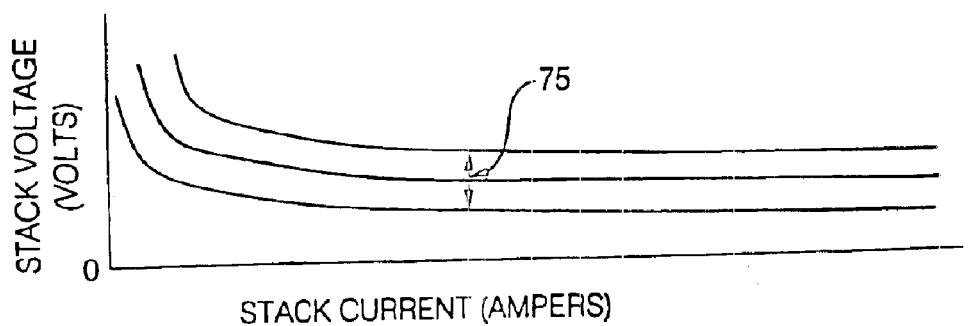
FIG. 3 is a graph depicting an exemplary fuel cell stack polarization curve.

In one preferred embodiment, the method of the present invention utilizes polarization curve data, i.e., voltage versus current, for a selected fuel cell stack design (See FIG. 3). The polarization curve is used as a symbolic reference against which to monitor actual voltage and current during operation, between start-up and shutdown. Therefore, while the fuel cell system is running, the BPM 71 measures the actual fuel cell stack current and actual voltage and compares the actual voltage with the expected voltage on the polarization curve, which data has been stored in memory as a two-dimensional voltage-current look-up table. If the measured/actual voltage (FIGS. 3 and 4) is different from the expected voltage in the polarization curve at a given load or current by a predicted variance value 75 (also stored in memory), a diagnostic is flagged and a remedial action signal is issued.

Figure 4:
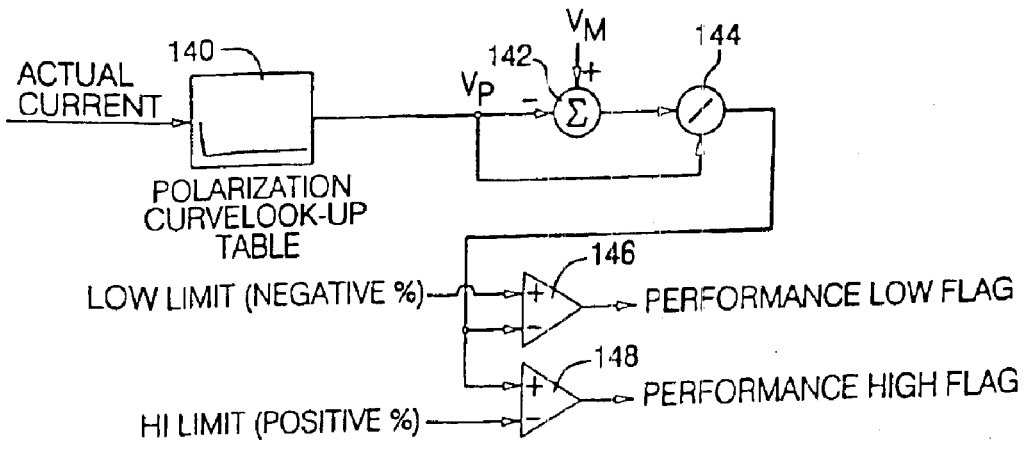
FIGS. 4 and 5 are flow diagrams depicting an implementation of a fuel cell stack monitoring control according to the present invention.

One specific implementation of the control method of the present invention is shown FIG. 4 in which the actual current is input to the BPM 71 or EECM 70 which accesses the polarization curve look-up table 140 in memory and outputs the predicted voltage at the level of the actual current. The predicted voltage Vp is summed in step 142 as a negative value with the magnitude of the measured voltage Vm. The difference between Vp and Vm is divided in step 144 by the magnitude of the predicted voltage Vp output from the polarization curve look-up table 140.

The result of the division is a value representing the percent error between the measured voltage Vm and the predicted voltage Vp at the level of the actual measured current.

The BPM 71 and/or EECM 70 implements the inventive method and contains the necessary hardware and software for receiving inputs and comparing the inputs to preselected values, and to carry out the method described above. If Vp is greater than Vm, the percent error is a negative value and compared with the actual negative low limit percent, such as a −3% from the above example in step 146. The resultant output labeled "performance low flag" is generated only when the variance or error exceeds the negative low limit error.

Similarly, the percent error from step 144 is compared with a high limit expressed as a positive percent value in step 148. Only when the percent error (Vm is greater than Vp) exceeds the high limit will an output labeled "performance high flag" be generated.

Figure 5:
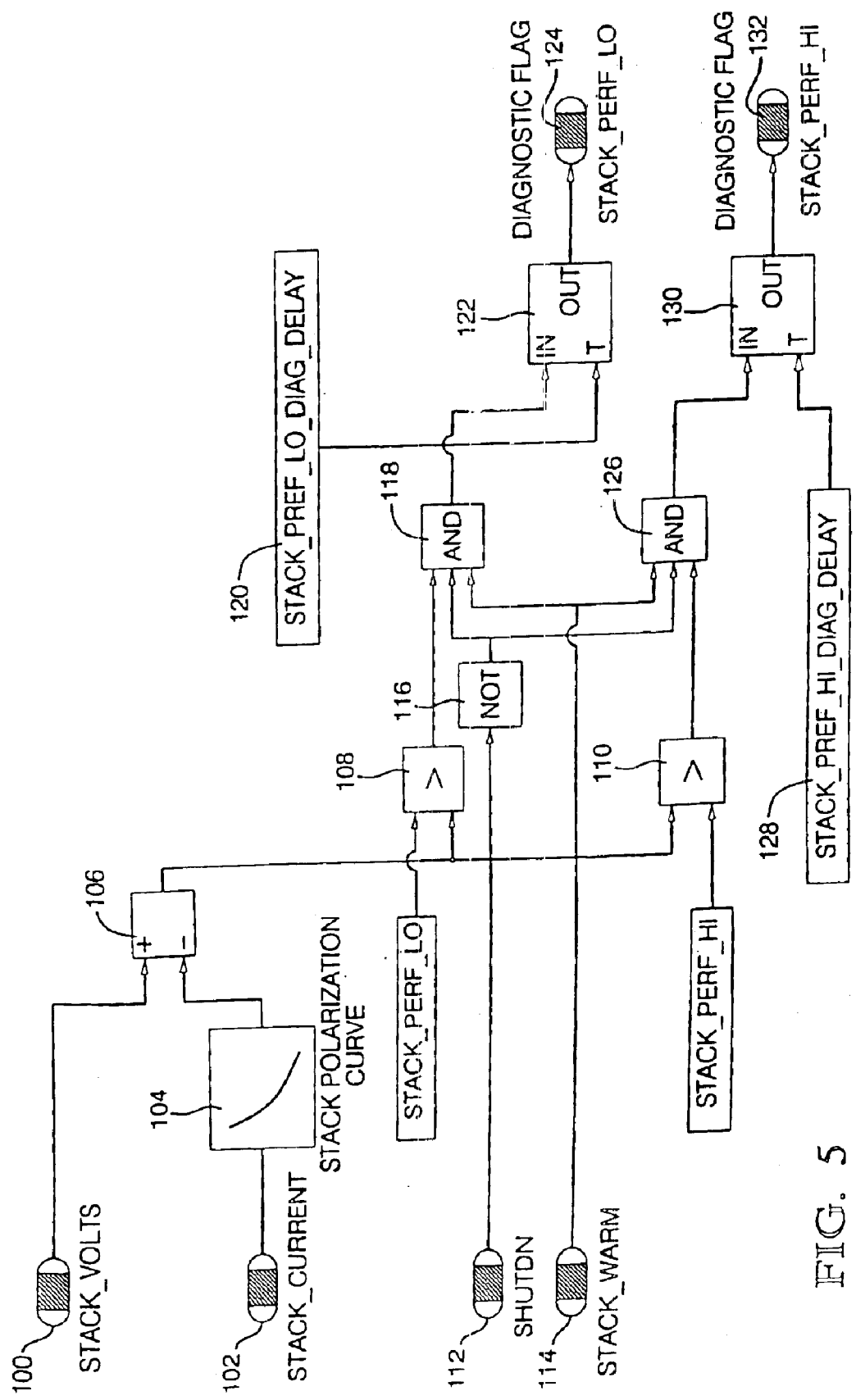

In another arrangement implemented in a control program executed by the EECM 70 and the BPM 71 as per FIG. 5, the voltage and current of the fuel cell stack are monitored by the BPM 71 (Steps 100 and 102). The actual current value is used by the BPM 71 to access the design polarization curve data stored in memory. Here, predicted voltage is determined as a function of the actual current, Vp(I) (Step 104). Next, the predicted voltage (Vp) is compared to the actual monitored voltage (Vm) (Step 106). The difference between Vp and Vm is then calculated to determine a variance. In one arbitrary alternative, the actual monitored voltage (Vm) is assigned a positive value and the predicted voltage (Vp) is assigned a negative value. If the variance is negative, a signal indicating a low limit is generated (Step 108). If the variance is positive, a signal indicating a high limit is generated (Step 110).

The fuel cell stack 22 is monitored to determine whether it is in shutdown mode (Step 112) and whether it is warm (Step 114), i.e., within a normal operating temperature range. If a shutdown mode is not requested (Step 116) and if the voltage (low) variance exceeds an acceptable level of variance (Step 108) and if the stack is warm (Step 114), then all of these conditions collectively indicate a diagnostic performance low shutdown (Step 118). However, such low variance diagnostic shutdown is subject to a time delay 120 in Step 122 before a shutdown 124 is initiated. The time delay provides the opportunity to screen out any noise or errant signals. Similarly, if the voltage (high) variance exceeds an acceptable limit of variance (Step 110) and if the stack is warm (Step 114) and is not already in a shutdown mode (Step 112), then these conditions collectively indicate a diagnostic shutdown performance high (Step 126). However, this high variance diagnostic shutdown is also subject to a time delay 128 in Step 130 before shutdown 132 is initiated.

It should be noted that stack warm temperature condition input (114) is used to prevent diagnostic system shutdown if the system is in a start up mode. The shutdown input (112) is used to prevent a diagnostic system shutdown if the system is already in a shutdown mode. Thus, the logic of the invention is adaptable to monitor low and high power conditions during a running mode. It is expected that a condition of getting less power than expected is more common than the condition of getting more power than expected from the stack. The simplest implementation is to include the polarization curve data in a look up table, with a given variance (delta) fixed along the entire curve. Another option is a percent variation that changes along the curve, or different variations for above and below the curve.

In the example given above, corrective action is a system shutdown. Other actions or responses are also contemplated including an alarm, indicator, reduction or power output from the fuel cell, etc. Different or the same shutdown or other remedial actions can be implemented for a low or high shutdown.

It will be understood that FIG. 4 and the description above relating thereto is to be interpreted by way of an example of one way of implementing the control method of the present invention. Other methods suggest themselves including:

The low limit and high limit expressed a negative percent and a positive percent of the predicted voltage can be a constant value over the entire polarization curve or over the full range of expected voltages and currents. It will also be understood that the variance or delta may be provided in varying amounts depending upon the particular location of the polarization curve in which the fuel cell is currently operating.

The control system of the present invention is particularly important where a fuel cell system does not directly monitor the rate of hydrogen flow to the fuel cell; that is, in cases where there is not a hydrogen sensor directly upstream of the fuel cell. In a fuel cell system it is important to match the load being demanded of a system with the rate at which reformate gas is supplied to the fuel cell. If it is attempted to draw more power out of the fuel cell than it is capable of supplying because there is not enough hydrogen to create electrical power, then it is possible to permanently degrade the fuel cell stack. Degradation can include breakdown of the membrane, polymer components. Therefore, it is advantageous to have the enhanced detection system of the invention to detect the situation where the amount of actual power is significantly different from the predicted power for a given load point.

In the absence of the system of the invention, it is typical to rely on absolute level of total fuel cell stack or cluster voltages, independent of the load point. This approach is useful to determine that a problem exists in the fuel cell. However, to be practical, the trip points for the diagnostic must be set to relatively low voltages or worst case levels to avoid unnecessary diagnostics and corrective action. This is undesirable because a problem may arise at a voltage above the low-voltage cut-off and the vehicle propulsion system continues to drive the load whereby voltage continues to decline. Then, degradation of the cell can result and it is also possible to incur a reverse polarity permanently. In this situation, the cell begins acting as a resistor and will begin heating up. As the cell continues to heat up, it will adversely affect the cell next to it and if heat effect is not abated, further deterioration is possible. In contrast, since the present invention compares actual power to expected power at a given load point, the diagnostic trip point is effectively variable as a function of load.

The invention provides many advantages over existing alternatives which address high and low voltage situations. In one existing alternative, for example, at the onset of a low voltage condition one present strategy is to significantly increase the amount of hydrogen sent to the fuel cell stack thereby increasing the amount of excess hydrogen referred to as lambda, during low voltage transients. This is less desirable since using a higher anode lambda may consume more hydrogen making the fuel cell system less efficient, precipitate need for a larger fuel processor, and increase the cost and size of the system. Another option is to ignore a low voltage reading during load transients. This option is less desirable since the potential consequences to the fuel cell stack are too great. A third option, as described above, is to monitor the voltage across the entire stack independent of load and feed this back to the vehicle load controller. This option is less desirable since the fuel cell stack voltage alone may not accurately detect a problem unless its relationship to current at a given load point is considered.

The method of the present invention is preferred over the existing options since, by the present invention, the fuel cell diagnostic is developed based on characteristics of the stack, actual versus expected power as a function of load, and operating conditions such as temperature and pressure which influence the power produced by the stack. This latter feature is particularly useful since stack operating temperature, nominally 70° C. to 80° C. in the laboratory, is expected to vary considerably under seasonal conditions.

What is claimed is:

1. A method for operating a fuel cell system with a fuel cell stack that supplies electrical power to an external load, comprising:
   monitoring actual stack operating voltage that is produced by said fuel cell stack;
   monitoring actual stack operating current that is produced by said fuel cell stack;
   looking up an expected high operating voltage value in a lookup table using said actual stack operating current of said fuel cell stack as a first lookup table reference;
   comparing said expected high operating voltage value to said actual stack operating voltage value; and
   generating a first signal if said actual stack operating voltage value exceeds said expected high operating voltage value.

2. The method of claim 1 further comprising:
   looking up an expected low operating voltage value in said lookup table;
   comparing said expected low operating voltage value to said actual stack operating voltage value; and
   generating a second signal if said actual stack operating voltage value is less than said expected low operating voltage value.

3. The method of claim 1 further comprising employing fuel cell stack temperature as a second lookup table reference.

4. The method of claim 1 further comprising employing fuel cell stack pressure as a second lookup table reference.

5. A monitor for a fuel cell system comprising:

a fuel cell stack;

a hydrogen source;

a voltage sensor that measures actual stack operating voltage that is produced by said fuel cell stack;

a current sensor that measures actual stack operating current that is produced by said fuel cell stack;

a lookup table that is accessed using said actual stack operating current of said fuel cell stack as a first lookup table reference and that provides an expected low operating voltage value; and a first comparator that compares said expected low operating voltage value to said actual stack operating voltage value and that generates a first signal if said actual stack operating voltage value is less than said expected low operating voltage value.

6. The monitor of claim 5 wherein said lookup table provides an expected high operating voltage value and further comprising a second comparator that compares said expected high operating voltage value to said actual stack operating voltage value and that generates a second signal if said actual stack operating voltage value exceeds said expected high operating voltage value.

7. The fuel cell monitor of claim 5 wherein said table uses fuel cell stack temperature as a second lookup table reference.

8. The fuel cell monitor of claim 5 wherein said table uses fuel cell stack pressure as a second lookup table reference.

9. A monitor for a fuel cell system comprising:

a fuel cell stack;

a hydrogen source;

a voltage sensor that measures actual stack operating voltage that is produced by said fuel cell stack;

a current sensor that measures actual stack operating current that is produced by said fuel cell stack;

a lookup table that is accessed using said actual stack operating current of said fuel cell stack as a first lookup table reference, wherein said table provides an expected voltage and a low voltage variation limit;

a divider that generates an actual stack voltage variation by dividing said actual stack operating voltage by said expected stack voltage; and a first comparator that compares said actual stack voltage variation to said low voltage variation limit and that generates a first signal if said actual stack voltage variation exceeds said low voltage variation limit.

10. The monitor of claim 9 wherein said lookup table provides a high voltage variation limit and further comprising a second comparator that compares said actual stack voltage variation to said high voltage variation limit and that generates a second signal if said actual stack voltage variation exceeds said high voltage variation limit.

11. The fuel cell monitor of claim 9 wherein said lookup table uses fuel cell stack temperature as a second lookup table reference.

12. The fuel cell monitor of claim 9 wherein said lookup table uses fuel cell stack pressure as a second lookup table reference.

* * * * *